INVENTOR.
BENJAMIN FOX

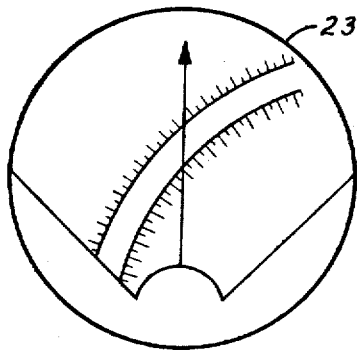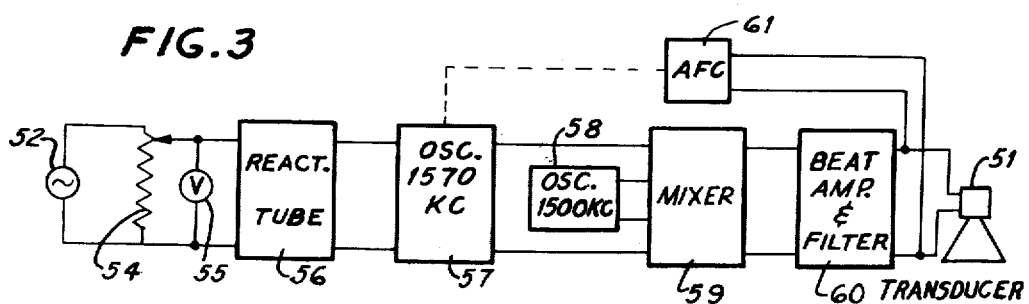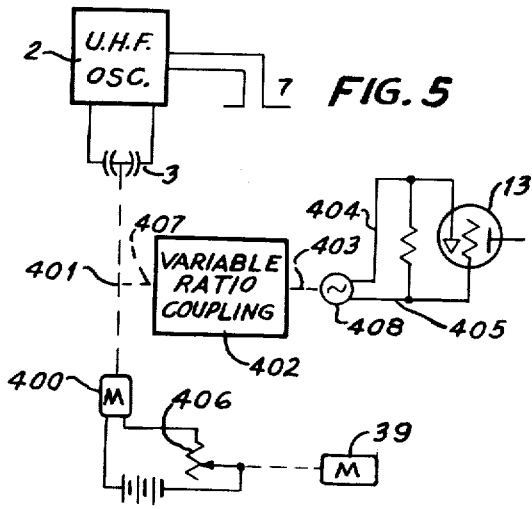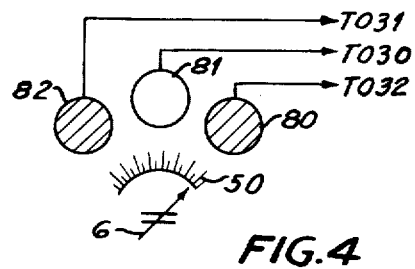

United States Patent Office 2,966,676
Patented Dec. 27, 1960

2,966,676

ELECTRONIC APPARATUS AND METHOD FOR MEASURING DISTANCE

Benjamin Fox, Belmar, N.J. (21—36 33rd Road, Long Island City, N.Y.); Bessie E. Fox, executrix of said Benjamin Fox, deceased, assignor to Bessie E. Fox Filed June 30, 1942, Ser. No. 449,121

33 Claims. (Cl. 343—14)

This invention relates to methods of and apparatus for purposes such as height, depth, and distance determination of objects from the earth or between two objects.

Another object of this invention is to devise means and methods of locating objects and measuring distance between two objects which are less subject to calibration errors.

A more specific object of the invention is to devise improved apparatus and methods for determining distance or altitude of an object from the earth of the type which comprises sending out a relatively high frequency radio or sound wave from an object above the earth such as an airplane. The wave is frequency modulated along a relatively wide band at a relatively low rate. The transmitted wave is directed toward the earth or object where it is reflected back toward the airplane and heterodyned there with the instantly transmitted wave. Due to the delay in transit toward and from the earth the two waves differ in frequency and the resulting beat frequency difference is a measure of the amount of delay or distance. For a description of the principles and prior practice with such systems reference is made to Newhouse Patent 2,247,662 and an article entitled: "A Terrain Clearance Indicator" by Lloyd Espenschied and R. C. Newhouse in the Bell System Technical Journal, vol. 18, pages 222–234, January 1939, as well as the bibliography therein. It is to be understood that these publications and any that are cited below are to be considered a part of this disclosure insofar as they disclose methods and design data and insofar as they illustrate specific forms which the component herein described may take or their equivalents.

Further objects of this invention will be apparent from the following description and drawings in which:

Fig. 2 is a diagram of a special indicator scale which is applicable to the system in Fig. 1.

Fig. 3 is a modification of a portion of Fig. 1.

Fig. 4 is another modification of a portion of the system of Fig. 1.

Fig. 5 illustrates a modification of Fig. 1.

Figure 1:
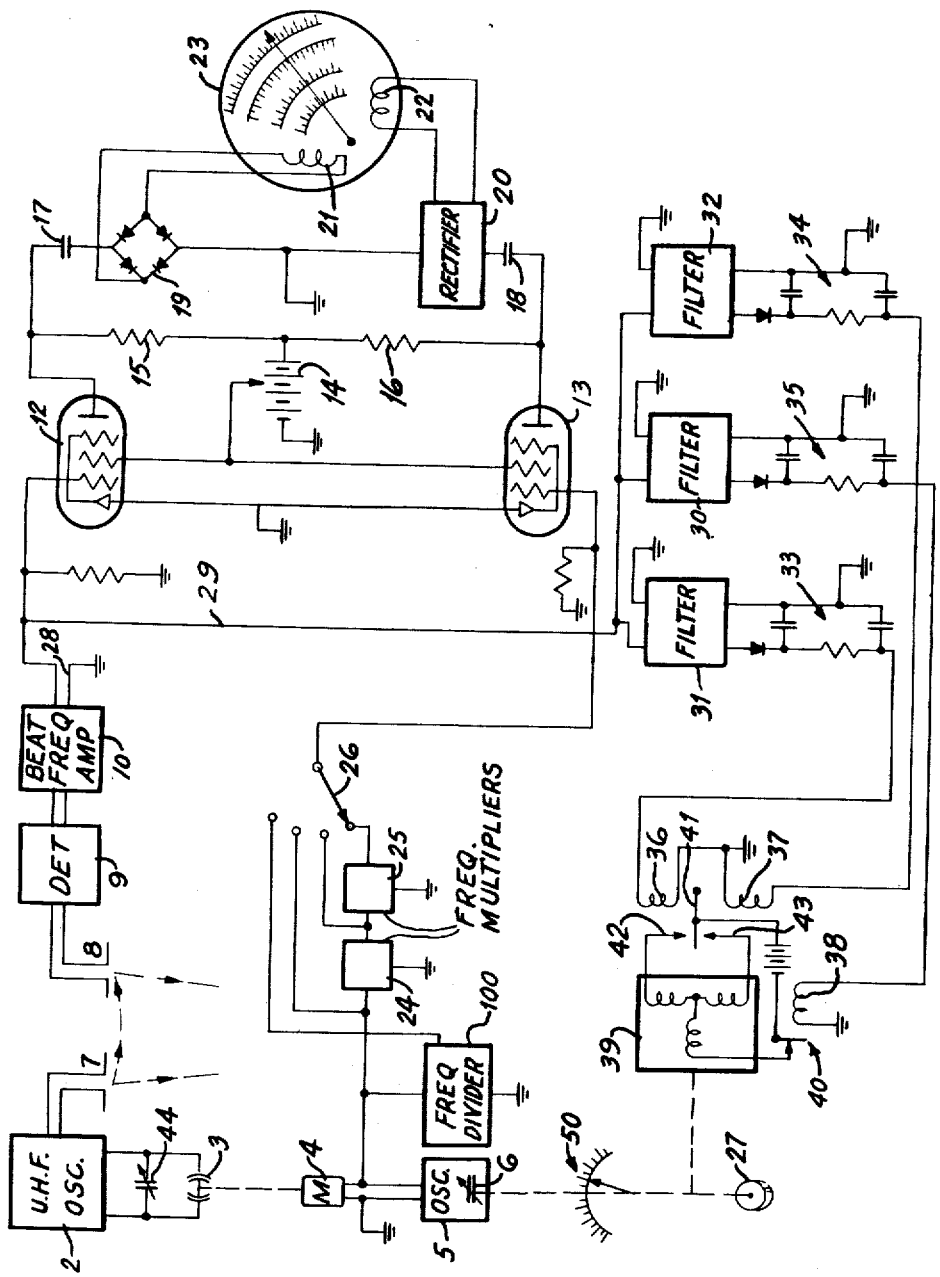
Fig. 1 is a diagram of an improved distance determining system.

Referring to Fig. 1, an ultra-high frequency oscillator 2 has its frequency varied preferably uniformly with respect to time over a wide band by means of a variable condenser 3 continuously driven by a synchronous motor 4 at a speed of 80 or more revolutions per second. The motor is energized by a low frequency oscillator 5, the frequency of which may be adjusted by a variable condenser 6. The above-mentioned Newhouse Patent 2,247,662 shows a suitable construction of the above-mentioned oscillator.

The frequency modulated wave from oscillator 2 is radiated by antenna 7 toward the earth as well as directly toward antenna 8 as indicated by the dotted lines and arrows. The reflected wave is also received at antenna 8 and combined with the direct wave by heterodyne detector 9. The resultant difference frequency is filtered and amplified by beat frequency amplifier 10 and then applied to a frequency measuring means of the electron or cycle counter type which is a modification of the one illustrated in the above-mentioned Newhouse patent.

The beat frequency is applied to the cathode and a grid of a pentode tube 12 which is alternately blocked and unblocked at each cycle of the applied beat frequency. When unblocked the anode-cathode impedance is very low so that practically the entire anode voltage from battery 14 is applied across relatively high resistance 15. When the tube is blocked on the negative portion of the cycle the cathode to anode impedance becomes practically infinite. Condenser 17 therefore acquires a predetermined charge, or energy quantum, during the negative half of the cycle and is discharged through the tube on the positive half. The charge and discharge pulses are then rectified by a full wave bridge rectifier 19 and applied to coil 21 of a current integrating meter 23. The number of charge and discharge pulses per second applied to coil 21 of meter 23 is a function of the beat frequency. If the meter is of the usual direct reading ammeter type the meter indication is a function of the frequency and can therefore be directly calibrated in terms of distance. This has been the practice of the prior art.

With the prior practice as thus far described the meter reading will be a function of the beat frequency B which, as explained in the above cited publications, is as follows:

$$B = 4 \Delta F \, f \, d/c \qquad (I)$$

where:

$\Delta F$ is the difference between the maximum and minimum frequencies of the wave radiated by antenna 7, i.e., the frequency modulation band-width.

$f$ is the number of times per second the frequency of the wave is varied from minimum to maximum and back to minimum, i.e., the modulating frequency; in this case controlled by the frequency of oscillator 5.

$d$ is the distance to be measured.

$c$ is a constant depending on the speed of propagation of the wave through the medium. With radio waves it is $3 \times 10^8$ meters per second.

It will be seen that if the factors $\Delta F$ and $f$ are kept constant then B will be directly proportional to distance $d$. This requires that the speed of motor 4 must be constant and that the characteristics of the tube 12, resistance 15, battery 14, condenser 17, rectifier 19 and the indicating meter must also be kept constant. This requires either elaborate regulating equipment to keep said characteristics constant, which is out of the question for light and rugged plane installations, or frequent checking and calibration. Even frequent calibration is not sufficient since under flight conditions temperature changes are likely to be extreme with the result that batteries, tubes, resistors, and fixed condensers in the cycle counting meter circuit will continuously change their values.

The present invention is designed to nullify the effects of most of the above factors. The low frequency voltage from frequency modulating oscillator 5 is applied either directly or through frequency divider 100 or frequency doublers 24 and 25, according to the position of selector switch 26, to a cycle counting circuit 13, 16, 18 and 20, having exactly the same characteristics as the beat frequency cycle counting circuit above described and energized by the same battery 14. The output of full wave rectifier 20 is applied to coil 22 of the meter. Coils 21 and 22 constitute the perpendicularly disposed coils of the conventional cross coil meter. As a result the meter pointer indicates the ratio of the currents in coils 21 and 22 and hence the ratio of the beat frequency and the frequency derived from oscillator 5. Since the same components and energizing potentials are used in both cycle counters they both change equally under the same conditions such as temperature variation or aging. But the ratio of currents in the meter would still remain constant.

As typical examples of the abovementioned cross coil meter, reference is made to Patents 1,695,264 and 2,213,099. It should be understood, however, that any other known type of cross coil meter or equivalent ratio-responsive network can be used.

If in Equation I we divide each side by $f$ we get $$B/f = 4\Delta F d/c \qquad (II)$$

and if $\Delta F$ is assumed constant $$B/f = kd \qquad (III)$$

where $k$ is a constant.

Since $B/f$ is indicated by meter 23 then it can be calibrated directly in terms of distance. Furthermore the frequency $f$ of oscillator 5 and therefore the speed of motor 4 need not be kept constant since any change in $f$ would affect both coils 21 and 22 in the same ratio and thus not affect the meter reading. The advantage of this is obvious since a need for a constant rate of frequency modulation is obviated.

The above described system permits other advantages. In the prior systems of this type the range of beat frequencies for a range of 15,000 feet extends from 160 to 120,000 cycles per second. The difficulties of designing an efficient beat frequency amplifier and filter for such a wide band are enormous. By means of this invention the modulating frequency can be reduced, by manual control 27 connected to condenser 6, when high altitudes are to be measured. This will result in reducing the beat frequency but since the ratio $B/f$ will remain constant no change in the meter reading will result. But it permits the advantage of restricting the frequency range and the necessary band-pass of the beat frequency amplifier 10.

This variation in modulating frequency can be accomplished automatically. To leads 28 and 29 at the output of beat frequency amplifier 10 are connected band filter 30 passing a band of frequencies above and below the center frequency of beat amplifier 10, the total band pass of filter 30 being narrower than that of beat frequency amplifier 10. Also connected to leads 28 and 29 are band pass filters 31 and 32 respectively passing frequencies above and below the limits of filter 30. The band pass of filters 31 and 32 overlap slightly with the upper and lower limits respectively of filter 30. The outputs of said filters are rectified and filtered at circuits 33, 34 and 35, respectively connected to relay coils 36, 37 and 38. Said relays control a reversible motor 39 as follows: When the beat frequencies are within the range of filter 30 relay 38 will open normally closed contacts 40 to open the battery circuit and keep the motor de-energized. If said beat frequencies are within the pass-band of filter 31 only, relay coil 38 will be deenergized and relay 36 will be energized to move the normally open armature 41 into contact with the upper contact 42 to close a circuit from the battery to one winding of motor 39, which will operate to rotate condenser 6, which is mechanically connected to motor 39, in such a direction as to reduce the frequency of oscillator 5. This will in turn reduce the speed of synchronous motor 4 and thus reduce the rate of frequency modulation of oscillator 2. From the above equations it will be seen that the beat frequency will be reduced until it comes into the range of filter 30 which in turn will cause energization of coil 38 and an opening of the motor circuit. If the beat frequency should fall below the range of filter 30 and into the range of 32 then coil 37 will close armature 41 and lower contact 43 and energize the reversing winding of motor 39 so that it operates in the reverse direction whereby it will operate to increase the frequency of modulating oscillator 5 until the beat frequency again falls within the range of filter 30 and motor 39 is stopped.

For reasons above pointed out, all this will not affect the reading of meter 23. This feature, however, permits use of very wide band frequency modulation for low altitudes and still permits use of a relatively narrow band beat frequency amplifier for measuring high altitudes. In fact, it is theoretically possible to make the pass-band of the beat amplifier as narrow as desired.

Switch 26 permits application of the fundamental, a subharmonic or harmonic of the modulating frequency to the cycle counter circuit for providing different altitude scales.

Because the pointer of meter 23 indicates the ratio of two frequencies a circular scale will not have scale divisions proportional to distance if the meter is calibrated directly in terms of distance. It will, however, have the advantage of giving more sensitive indications at low altitudes. However, the scale may be inscribed along a straight line perpendicular to the pointer at the zero point or a curve of changing radius of curvature such as shown in Fig. 2 in order to even out the calibration spread.

There remains only one other factor which must be kept constant. As shown by the above formula, the beat frequency is a function of $\Delta F$, the difference between the upper and lower frequency of the wave generated by the ultra high frequency oscillator. This is extremely difficult since ultra high frequency oscillators which are easily modulated over a wide band are extremely sensitive to variations in temperature, applied potentials, and oscillator component characteristics. To provide an adjustment for this factor, variable condenser 44 is connected in parallel with rotating condenser 3. This permits adjustment of the mean frequency of oscillator 2 and therefore $\Delta F$, since the change in oscillator frequency by a given change in the capacity of rotating condenser 3 is proportional to the square of the mean frequency. If desired, a frequency modulation band width indicator can be used to facilitate this adjustment. Several such instruments have been described in the recent literature for use with frequency modulation broadcast equipment.

This method of distance indication can also be used with acoustic waves in air or water. Instead of antennas, sound and pickup generators designed for the medium to be used are excited by varying frequencies from oscillator 2. The sounds may be audible but are preferably ultra-audible and may range from 20–100 kilocycles (kc.). Electromagnetic, piezoelectric, or magnetostrictive transducers can be used for this purpose, depending on the range of frequencies used and distances to be measured. Because of the relatively low transmission speed in sound media, a relatively low frequency modulation rate $f$ must be used. To get sensitive indication for low altitudes it is, however, still necessary to get a very wide modulation band $\Delta F$. This is difficult with such low frequencies if an oscillator directly modulated by a rotating condenser is used.

The system in Fig. 3 shows a way to avoid this difficulty. Assume that it is desired to energize the sound transducer 51 with a varying frequency current of $70 \pm 6$ kc. The output of a low frequency modulating oscillator 52, the voltage of which is regulated by slider 53 of potentiometer 54 and indicated by voltmeter 55, applied to the grid of an electronic reactance tube circuit of conventional type which can be inductive, capacitative, or a combination of both. The tube is connected across the frequency determining circuit of the oscillator and is so designed that it will vary the frequency of said oscillator frequency over a width of $1570 \pm 6$ kc. This varying frequency is heterodyned with a fixed frequency of 1500 k.c. from crystal stabilized oscillator 58, both frequencies being applied to mixer 59, the output of which will yield difference frequencies of 70±6 kc. which are filtered and amplified at 60 and applied to transducer 51, which will convert the energy to a sound wave. The difference frequency can also be applied to an automatic frequency control circuit 61 which will in turn stabilize the mean frequency of oscillator 57 by means well known in the art, one of which is described in Morrison Patent 2,250,104. This method permits a wide band of frequency modulation since the amount of capacity variation necessary to modulate a frequency of 1570 kc. over a band of 12 kc. is less than 1/500 of that necessary to get the same frequency variation at 70 kc.

The other elements to be used with a sound wave system such as in Fig. 3 are the same as shown in Fig. 1. Instead of using dividers and doublers for different meter scales as in Fig. 1, the same result can be obtained by using different values of modulation band-widths $\Delta F$. This can be done by setting potentiometer 54 to different voltages which in turn control $\Delta F$. Changing $\Delta F$ will change the range of beat frequencies generated, as will be evident from a consideration of Equations I and II.

Fig. 5 shows another modification of Fig. 1. Motor 400 drives frequency modulating condenser 3 by means of shaft 401. Since the motor speed of motor 400 need not be kept constant as above pointed out, it can be an ordinary cheap direct current motor excited by a battery in series with a variable rheostat 406. Also coupled to shaft 401 is a shaft 407 which is coupled to shaft 403 of low frequency A.C. generator 408 by means of a variable speed transmission. Said generator is directly connected to cycle counter tube 13 in Fig. 1, so that the latter is controlled by a frequency proportional to the motor speed. The variable speed transmission 402 is used to vary the relative speed of the generator to provide for different meter scales and thus eliminates the need for expensive frequency dividers or multipliers. The automatic speed control is accomplished as in Fig. 1 by coupling the shaft of reversible motor 39 to the control arm of rheostat 406.

It should be noted that the cycle counter circuits and meter can be used as an accurate frequency measuring or comparing device by connecting a stable source of known frequency, such as a crystal oscillator, to the grid and cathode of tube 12 and connecting the unknown frequency source to the other tube 13. The meter 23 can be calibrated directly in terms of frequency. Frequency dividers and multipliers can be used with the stable oscillator as in Figure 1 to provide different meter scales.

Another modification of Fig. 1 can be used for distance indication in a different way. By sharply tuning amplifier 10 and/or filter 30 to some definite beat frequency and making filters 31 and 32 responsive respectively above and below said frequency, a distance measurement can be obtained without the use of the cycle counting circuits and meter 23. Under control of filters 31 and 32 the reversible motor 39 will vary the frequency of oscillator 6 until the beat frequency falls within the range of sharply tuned filter 30. Reference to Equation I will show that if the beat frequency is constant then modulating frequency $f$ will be different for each distance to be measured. By adding a scale 50 to the shaft of condenser 6 calibrated in frequency or distance a direct reading of such distance will be obtained. By merely inserting differently colored lamps 80, 81, and 82, as shown in Fig. 4 in the filter output circuits and positioning them near scale 50 the reversible motor can be eliminated and the shaft of condenser 6 can be manually varied until the proper signal lamp operates.

Instead of accomplishing this result by varying the modulating frequency $f$, the same result can be obtained by varying $\Delta F$, since the latter also controls the beat frequency as shown in Equations I and II. This is done by varying the mean frequency of ultra-high frequency oscillator 2 by a change in the setting of condenser 44, since for a given reactance variation, the frequency modulation band-width $\Delta F$ varies with the mean frequency. The same result can be accomplished by keeping the mean frequency of the oscillator constant and adjusting the position of resistance slider 54 to reduce the maximum modulating voltage, and hence $\Delta F$. Said condenser or resistor will then be supplied with a scale calibrated in terms of distance.

It should be understood that the expedients above described are not necessarily restricted for the purpose described but are of general utility. The scope of the invention is to be limited only by the terms of the appended claims. Also in said claims, the term timing modulation is to be understood as generic to both phase and frequency modulation.

The invention described herein may be manufactured and used by or for the Government for governmental purposes, without the payment to me of any royalty thereon.

I claim:

1. In a distance responsive system, means for generating a frequency modulated wave having a given range of frequency modulation, means for radiating said wave toward a reflecting object, means for combining said radiated and reflected waves to form a beat frequency, a sharply tuned filter having a pass-band which is narrow relative to the frequency modulation range and connected to the output of said combining means for selecting a predetermined beat frequency, and said generating means including means for so varying the modulation of said frequency modulated wave that said beat frequency comes within the range of said filter.

2. In a system as claimed in claim 1, in which said last named means varies the cyclical rate of the modulation of said frequency modulated wave.

3. In a system as claimed in claim 1, in which said last named means varies the mean frequency of said frequency modulated wave.

4. In a system such as claimed in claim 1, in which said last named means varies the modulation band width of said frequency modulated wave.

5. A distance indicating system comprising a radio frequency transmitter, a periodically varying means for modulating the frequency of said transmitter, means for radiating the waves from said transmitter toward a reflecting object, means to mix both the transmitted and reflected waves to derive a beat frequency, and means to compare said beat frequency with the frequency of said periodically varying means, said comparing means comprising a cycle counting circuit responsive to said beat frequency, a cycle counting circuit responsive to said periodically varying means, and a cross coil meter responsive to the outputs of both cycle counting circuits.

6. A distance responsive indicating system comprising means for generating a wave, means for cyclically varying the frequency of said wave substantially linearly with time, means for radiating said wave in a medium, means for receiving reflected waves from a point in said medium, means for heterodyning said radiated and reflected waves to derive one of a range of beat frequencies, said range depending on the range of distances to be measured and the frequency of said cyclical variation, tuned filter means having a pass-band which is narrower than said range of beat frequencies, means responsive to said derived beat frequency to vary the frequency of said cyclical variation until said derived beat frequency falls within the pass-band of said filter, and means responsive to the ratio of the beat frequency in the output of said filter and the frequency of said cyclical variation to provide an indication of said distance.

7. A distance responsive system comprising means for generating a wave, means for cyclically varying the frequency of said wave substantially linearly with time, means for radiating said wave toward a point, means for receiving a wave reflected from said point, means for heterodyning said radiated and reflected waves to derive a beat frequency, and means responsive to substantially the ratio of said beat frequency and the frequency of said cyclical variation to provide an indication of said distance.

8. A distance indicating system comprising means for generating a wave, means for cyclically varying the frequency of said wave substantially linearly with time, means for radiating said wave in a medium, means for receiving reflected waves from a point in said medium, means for heterodyning said radiated and reflected waves to derive a beat frequency, a sharply tuned filter having a pass-band which is narrow relative to the range of variation of the frequency of the radiated wave and connected to the output of the heterodyning means, means to vary the frequency of said cyclical variation until said derived beat frequency falls within the range of said filter, indicating means responsive to the output of said filter, and means for determining the frequency of said cyclical variation, when said indicating means operates, to indicate the distance of said reflecting point.

9. The method of determining the distance between a given point in a wave transmitting medium and a reflecting point in said medium, which includes the steps of transmitting from said given point toward said other point a wave, the frequency of which is periodically varied substantially linearly with time, receiving at said given point reflected waves, heterodyning said transmitted and received waves to derive a beat frequency which is substantially constant during an appreciable portion of a period of the frequency variation, causing said beat frequency to so vary at least one of the characteristics of said transmitted wave until said beat frequency reaches a predetermined value, and using the variation of said characteristic to determine the distance of said reflecting point.

10. The method as set forth in claim 9, wherein the varied characteristic of the transmitted wave is the frequency of said periodic variation, and wherein said frequency is measured to determine said distance.

11. Those steps in the method of determining the distance of a point in a medium, which include generating a wave, periodically varying the frequency of said wave substantially linearly with respect to time, radiating said wave through said medium towards said point, receiving from said point waves the frequency of which varies in the same manner as said transmitted waves, the instantaneous frequencies of both waves differing from each other by an amount depending on said distance, heterodyning said transmitted and received waves to derive a beat frequency which varies over a predetermined range depending on the range of distances to be measured and the frequency of said periodic variation, selecting only beat frequencies over a portion of said beat frequency range, and varying the frequency of said periodic variation until said beat frequency falls within said portion of said range.

12. The method of determining the distance of a point in a medium, which comprises the steps of generating a wave, periodically varying the frequency of said wave, radiating said wave through said medium towards said point, receiving from said point waves the frequency of which varies in the same manner as said transmitted waves, the instantaneous frequencies of both waves differing from each other by an amount depending on said distance, heterodyning said transmitted and received waves to derive a beat frequency which depends on said distance and the frequency of said periodic variation, using said beat frequency to generate an energy component which is substantially proportional to said beat frequency, generating a second energy component which is substantially proportional to the frequency of said periodic variation, and determining the ratio of the magnitudes of said energy components to determine said distance.

13. The method of determining the distance of a point in a medium which comprises the steps of transmitting toward said point a wave, periodically varying the frequency of said wave substantially linearly with respect to time, receiving reflections from said point, heterodyning said transmitted and received waves to derive one of a range of beat frequencies, said range depending on the range of distances to be determined and the frequency of said periodic variation, selecting beat frequencies over only a portion of said range, using beat frequencies outside said portion to vary the frequency of said periodic variation until said beat frequency falls within said portion of said range, using a selected beat frequency to generate an energy component substantially proportional to said selected beat frequency, generating a second energy component which is substantially proportional to said frequency of periodic variation, and determining the ratio of the magnitudes of said energy components to determine said distance.

14. In a distance measuring system, means of the sawtooth type for generating oscillatory energy the frequency of which varies according to a linear periodic function with respect to time, adjustable means for establishing a given period of frequency variation thereby establishing a focus distance for said system, means for transmitting a portion of the oscillatory energy generated to a remote object, means for receiving oscillatory echo energy from said remote object and for deriving oscillatory electrical energy therefrom, means for combining the derived oscillatory electrical energy with another portion of the generated oscillatory energy to produce oscillatory beat energy having a substantially constant frequency when said remote object is substantially at the focus of said system and which frequency is unrelated to the distance between said transmitter and said remote object, indicating means, means connected to said indicating means for selecting and passing energy waves at substantially a single frequency which corresponds to said constant frequency and for rejecting all other energy waves whereby said indicating means indicates the presence of said remote object only if it lies substantially at the focus of said system, the period of variation of said oscillatory energy generating means when said indicating means indicates the presence of a remote object being a measure of the distance to the remote object.

15. A beat frequency altimeter arrangement of the kind specified comprising a ratiometer having two operating coils, means for deriving beat frequency waves from the transmitted and reflected waves, means for deriving from the said beat frequency waves an electric current whose magnitude depends upon the said beat frequency, and means for supplying the said current and also a reference current included in said second-mentioned means, respectively to the said coils whereby variations of said reference current are prevented from affecting the indication of said ratiometer.

16. A beat frequency altimeter arrangement of the kind specified comprising a ratiometer having two operating coils, means for deriving beat frequency waves from the transmitted and reflected waves, means for deriving from the said beat frequency waves an electric current whose magnitude depends upon the said beat frequency, means for supplying the said current to one of the said coils, and means for supplying to the other coil a reference current whose magnitude depends upon the frequency of the waves which modulate the said transmitted waves.

17. A beat frequency altimeter arrangement comprising a modulated transmitter, a detector for detecting the tarnsmitted and the reflected waves of said transmitter, a ratiometer having two operating coils, means for deriving beat frequency waves from the transmitted and reflected waves, means for deriving from said beat frequency waves an electric current whose magnitude depends upon said beat frequency, means for applying said beat frequency waves to control the frequency of the modulation of said transmitter, means for supplying the said current to one of said coils, and means for supplying the other coil with a reference current whose magnitude depends upon the frequency of the modulation of said transmitter.

18. An arrangement according to claim 17 in which the modulator of said transmitter generates two frequencies which have a constant ratio, one of which said two frequencies modulates said transmitter while the other of said two frequencies is used to derive the said reference current.

19. A beat frequency altimeter arrangement comprising a modulated transmitter, a detector for detecting the transmitted and reflected waves of said transmitter, a ratiometer having two operating coils, means for deriving beat frequency waves from the transmitted and reflected waves, means for deriving from said beat frequency waves an electric current whose magnitude depends upon said beat frequency, means for applying beat frequency waves to control the frequency of the modulation of said transmitter, means for supplying the said current to one of said coils, means for causing said modulator to generate two modulation frequencies which have a constant proportionality, means for changing said constant proportionality in a plurality of steps, means for modulating said transmitter with one of said modulation frequencies, and means for deriving a reference current from the other of said modulation frequencies, and means for supplying the other coil of said ratiometer with said reference current, whereby said altimeter is provided with a corresponding plurality of different ranges.

20. An arrangement according to claim 17 in which the said current is proportionally dependent on said beat frequency.

21. A beat frequency altimeter arrangement comprising a transmitter of electrical energy waves, a detector for detecting the transmitted waves and the waves due to reflection of said transmitted waves; a frequency meter having two coils, means for deriving beat frequency waves from said transmitted and reflected waves, a source of energy having a reference frequency, counter circuit means for deriving electric currents from said beat and said reference frequency, the magnitude of which are dependent thereon, and means for applying said currents to said frequency meter coils.

22. An altimeter arrangement according to claim 21, in which said counter circuit means comprises two counter circuits operated from a common source of voltage, said counter circuits comprising similar arrangements of circuit elements having characteristics which may vary similarly with changes in external conditions, and a thermionic valve acting as a switch to alternately charge and discharge a condenser included in said circuit elements in such a way that both the charge and the discharge currents pass in the same direction through the said coils, whereby said counter circuits each produce a current proportional to the frequency of the waves applied thereto.

23. A signal translating system, comprising two sources of high frequency oscillations of different frequency, means for separately frequency modulating the oscillations of each of said sources by a signal, means for combining said separately modulated oscillations for deriving a lower frequency carrier wave containing the frequency modulation band without diminution in width.

24. A system according to claim 23, wherein the modulating means includes two channels coupled to a mixer circuit, the high frequency sources for the respective channels differ in frequency by an amount equal to said lower frequency, and means for connecting the signal to modulate said sources in phase opposition.

25. A radio distance measuring system comprising, means for transmitting frequency-modulated signals for reflection from a remote wave reflecting surface, means for controlling the modulation rate of said frequency-modulated signals as an inverse function of the distance between said signal transmitting means and said surface, means for receiving said frequency-modulated signals after reflection from said surface, means for combining said received signals with said transmitted signals to produce beat frequency signals in response thereto, means including a bandpass filter responsive to passage of beat signals through said filter to produce a voltage having a first amplitude level and responsive to the absence of signals at the output of said filter to produce a voltage having a second amplitude level, and means responsive to said second voltage amplitude level for varying said modulation rate to produce beat frequency signals at the output of said bandpass filter.

26. The method of echo ranging which comprises the steps of propagating a wave toward a reflecting surface, said wave having a predetermined initial frequency; varying the frequency of said wave precisely linearly during a measured time interval from said initial frequency to a predetermined final frequency; receiving the wave reflected from such surface; deriving from said propagated and received waves a third wave having a frequency which is continuously equal to the frequency difference between said propagated and received waves at every instant; sharply selecting from said third wave a component, if any, having a fixed predetermined frequency; and varying the time rate of said precisely linear frequency variation to obtain a definite measurable magnitude for said selected component of said third wave, whereby the magnitude of said time rate of said linear frequency variation which accompanies the obtaining of said definite magnitude for said component is inversely proportional to the distance traveled by said propagated wave in producing said reflected wave at the time when said definite magnitude for said component is obtained.

27. The method according to claim 26, in which the frequency interval between said initial frequency and said final frequency is maintained at a constant value, and wherein said measured time interval which accompanies the obtaining of said definite magnitude for said selected component is varied, whereby the magnitude of said time interval is directly proportional to said distance traveled by said propagated wave.

28. The method according to claim 26, wherein said time interval is maintained at a constant value, and wherein the interval between said initial frequency and said final frequency is varied, whereby said distance traveled by said propagated wave is inversely proportional to the difference between said intial and said final frequencies through which the frequency of said propagated wave is varied when said definite magnitude for said selected component is obtained.

29. The method of echo ranging which comprises the steps of propagating an acoustic wave of substantially sinusoidal wave shape in an acoustically conductive medium toward a zone of discontinuity of the acoustic impedance of said medium, said wave having a predetermined initial frequency; varying the frequency of said wave precisely linearly during a measured time interval to a predetermined final frequency; receiving the acoustic wave reflected from said zone of impedance discontinuity; deriving from said propagated and received waves a third wave having a frequency which is continuously equal to the frequency difference between said propagated and received waves at every instant; sharply selecting from said third wave a component, if any, having a fixed predetermined frequency; and varying the time rate of said precisely linear frequency variation to obtain a definite measurable magnitude for said selected component of said third wave, whereby the magnitude of said time rate of said linear frequency variation which accompanies the obtaining of said definite magnitude for said component is inversely proportional to the distance traveled by said propagated wave in producing said reflected wave at the time when said definite magnitude for said component is obtained.

30. The method according to claim 29, in which the frequency interval between said initial frequency and said final frequency is maintained at a constant value, and wherein said measured time interval is varied, whereby the magnitude of said time interval which accompanies the obtaining of said definite magnitude for said selected component is directly proportional to said distance traveled by said propagated wave.

31. The method according to claim 29, wherein said time interval is maintained at a constant value, and wherein the interval between said initial frequency and said final frequency is varied, whereby said distance traveled by said propagated wave is inversely proportional to the difference between said initial and said final frequencies through which the frequency of said propagated wave is varied when said definite magnitude for said selected component is obtained.

32. Echo ranging apparatus of the class described, comprising variable frequency wave generating means; means for varying said frequency with precise linearity from a predetermined initial frequency to a predetermined final frequency over an adjustable measured time interval; wave propagating means energized by said wave generating means; wave receiving means for receiving a reflected wave produced by said wave propagated by said propagating means; heterodyning means for deriving the beat frequency between said oscillator frequency and the frequency of said received wave; sharply selective means connected to said heterodyning means for selecting a component of a predetermined fixed frequency from said beat frequency; and indicating means responsive to the magnitude of said component, whereby the time rate of change of said precise linear variation is inversely proportional to the distance traveled by said generated wave in producing said reflected wave in generating a component of any particular indicated magnitude.

33. Echo ranging apparatus according to claim 32, further comprising recycling means for causing said wave generating means to sweep repeatedly through a fixed frequency range beginning with said initial frequency and ending with said final frequency.

References Cited in the file of this patent

UNITED STATES PATENTS

| | | |
|---|---|---|
| 1,629,685 | Ditcham | May 24, 1927 |
| 1,695,264 | Adams | Dec. 18, 1928 |
| 1,917,064 | Romnes | July 4, 1932 |
| 1,955,005 | Maloney | Apr. 17, 1934 |
| 2,011,392 | Bentley | Aug. 13, 1935 |
| 2,063,074 | Armstrong | Dec. 8, 1936 |
| 2,176,742 | Pierre | Oct. 17, 1939 |
| 2,206,896 | Higgins et al. | July 9, 1940 |
| 2,208,349 | Ulbright | July 16, 1940 |
| 2,213,099 | Adorjan | Aug. 27, 1940 |
| 2,247,662 | Newhouse | July 1, 1941 |
| 2,248,132 | Smith | July 8, 1941 |
| 2,248,599 | Alexanderson | July 8, 1941 |
| 2,250,104 | Morrison | July 22, 1941 |
| 2,253,975 | Guanella | Aug. 26, 1941 |
| 2,261,272 | Newhouse | Nov. 4, 1941 |
| 2,284,850 | Smith | June 2, 1942 |
| 2,298,436 | Usselman | Oct. 13, 1942 |

FOREIGN PATENTS

| | | |
|---|---|---|
| 103,163 | Australia | Feb. 2, 1938 |